United States Patent [19]
Yoshida

[11] Patent Number: 4,476,981
[45] Date of Patent: Oct. 16, 1984

[54] REJECTION SYSTEM

[75] Inventor: Hajime Yoshida, Tokyo, Japan

[73] Assignee: Hajime Industries Ltd., Japan

[21] Appl. No.: 372,660

[22] Filed: Apr. 28, 1982

[30] Foreign Application Priority Data

May 9, 1981 [JP] Japan .................. 56-69623

[51] Int. Cl.³ .............................. B07C 5/36
[52] U.S. Cl. .................... 209/566; 198/372; 198/436; 209/653; 361/167
[58] Field of Search .............. 209/552, 563–566, 209/651, 653, 916; 198/372, 436; 361/167, 191

[56] References Cited

U.S. PATENT DOCUMENTS

| | | | |
|---|---|---|---|
| 2,873,855 | 2/1959 | McCormick | 209/566 |
| 3,433,343 | 3/1969 | Giulie | 198/436 X |
| 3,627,127 | 12/1971 | Whiteford et al. | 209/566 |
| 3,802,559 | 4/1974 | Luchetti et al. | 209/565 X |
| 3,930,994 | 1/1976 | Conway et al. | 209/565 X |
| 4,249,661 | 2/1981 | Lem | 209/564 |

Primary Examiner—Robert B. Reeves
Assistant Examiner—Edward M. Wacyra

[57] ABSTRACT

A rejection system for use with an inspection system, which inspects a number of products transferred at high speed on a conveyor at a predetermined inspection position and generates a product reject signal as well as a product inspection position arrival signal is disclosed, in which there are provided a plurality of product rejection mechanisms for rejecting unnecessary products from the conveyor at different position and a driving circuit for driving the plurality of product rejection mechanism. In this case, the driving circuit receives the product reject signal and product inspection position arrival signal from the inspection system and then produces driving signals to drive the plurality of product rejection mechanisms in time sharing manner whereby the plurality of product rejection mechanisms reject the unnecessary products from the conveyor at different positions.

4 Claims, 19 Drawing Figures

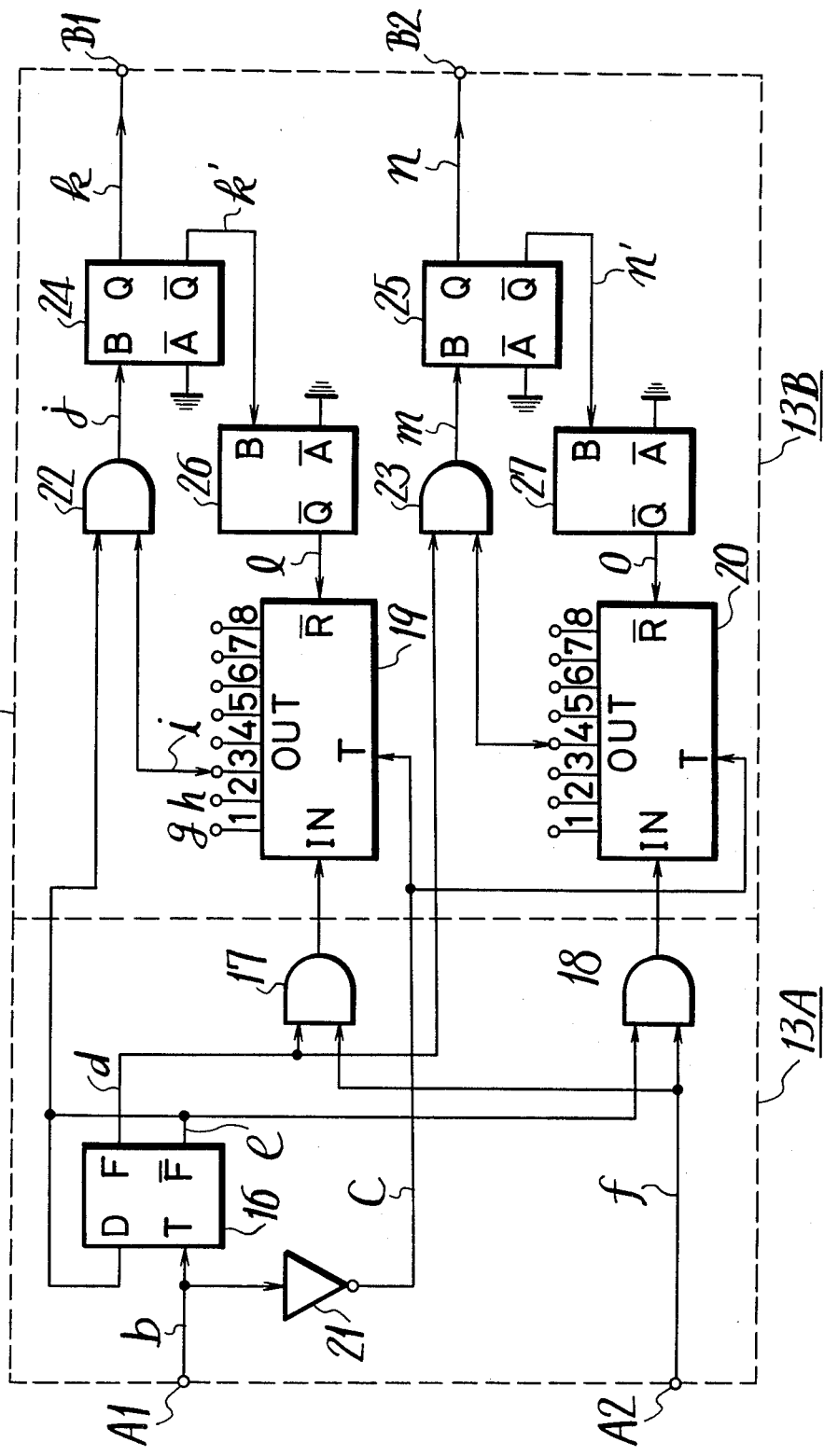
F I G. 2

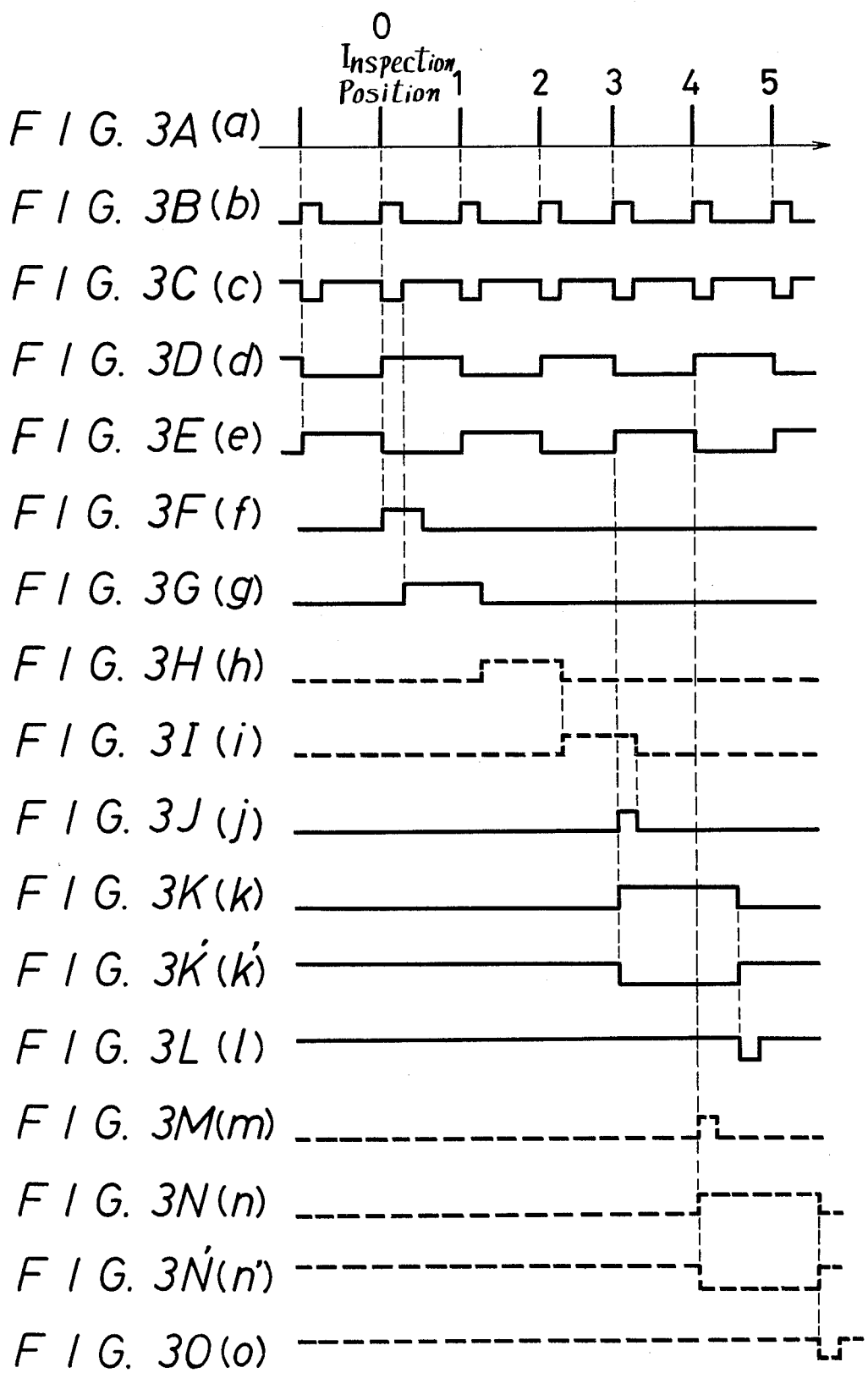

REJECTION SYSTEM

BACKGROUND OF THE INVENTION

1. Field of the Invention

The present invention relates generally to rejection systems, and more particularly to rejection systems for use with a product inspection system that are used to reject, for example, faulty products during product inspections.

2. Description of the Prior Art

In order to reduce labour costs, automation or an ultimate "no man" status at the inspection processes of products or the like, various types of automatic inspection systems that judge whether products are good or bad by using image sensors or the like, and then by processing electrical signals from the image sensors have been proposed, to replace the conventional human dependent visual inspection to check shape, colour, flaws, dirt, etc. of products.

Normally, since such objects being inspected are moving at high speeds on belt conveyers or the like, such inspection systems must positively judge whether the objects are good or bad while they are moving at high speeds within a short period of time. At the same time, when a bad product is discovered by the inspection system among the products that are flowing at high speeds on a conveyer, a rejection system must be driven by the rejection signal that is generated from the inspection system, to reject the bad product from the conveyer belt at a proper location. The bad product that is rejected from the conveyer by such rejection system is placed into an accumulation bucket or shifted onto another bad product transfer conveyer. As the belt conveyer flow speed is increased to higher speeds, the quantity of the objects to be inspected that flow within a given period of time increases so that the demand increases for the inspection system to have a corresponding inspection capability, along with the rejection capability of the rejection system to surely reject the bad products in compliance with the reject signals that are produced from the inspection system.

As for the inspection capabilities of the inspection system, since the new types of electronic circuitries are mainly used, it is relatively easy to shorten the inspection processing time. However, it would be meaningless, if the bad product rejection system that is to function by receiving the reject signals as delivered from the inspection system cannot surely follow up such signals even though the inspection capability of the inspection system is increased by shortening the inspection processing time.

The methods of rejection that are conventionally used to reject bad products depend upon suction or jet of air, or direct push out of the rejects, or changing the flow direction of the bad product by valves, etc. In such cases, the majority depends upon solenoids that use electro magnetic force to drive the bad product rejection mechanisms. For instance, for bad product rejection by air jet, a solenoid valve is used for pneumatic control, or otherwise, for the direct bad product rejection mechanism drives, magnetic solenoids of the types having plunger or rotary solenoids are used. Such magnetic solenoids require about 0.1–0.2 seconds of function time normally when in operation under load. If this function time is converted to the number of operations per minute, 600 to 300 are obtained. In other words, no matter how short the inspection processing time of the inspection system may be, the bad product rejection capabilities of the rejection systems limit the maximum product speeds to around 300 to 600 pieces per minute.

Generally, it is difficult to shorten the function time of magnetic solenoids, and although improvements are made, it is impossible to drastically shorten the function time.

OBJECTS AND SUMMARY OF THE INVENTION

Accordingly, it is an object of the present invention to present a rejection system which sufficiently and surely displays a bad product rejection function even though it is used in combination with a high speed automatic inspection system on a belt conveyer which is driven at high speed, in spite of using the functional components such as solenoids as above described that require relatively long time to function.

According to the present invention, when the rejection capability to reject bad products by the bad product rejection mechanism is constant, for instance at 600 pieces per minute, in order to double the capability, two sets of bad product rejection systems are arranged on one inspection system as an example. The two sets of bad product rejection systems are driven in a division manner so that the rejection capability is doubled to 1200 pieces per minute.

Further, in order to raise the bad product rejection capability, more than three sets of bad product rejection mechanisms may be combined relatively with the speed of the belt conveyer which carries the inspected objects.

However, although two sets of bad product rejection mechanisms or more are simply used for one inspection system, it would be impossible to surely reject the bad products with the two or more sets of bad product rejection mechanisms by the reject signal that is derived from the inspection system. Therefore, in the present invention, a control signal generator system is arranged to produce signals to properly drive a plurality of bad product rejection mechanisms.

According to an aspect of the present invention, there is provided a rejection system for use with an inspection system, which inspects a number of products transferred at high speed on a conveyer at a predetermined inspection position and generates a product reject signal as well as a product inspection position arrival signal, rejecting unnecessary products from said conveyer in response to said product reject signal, which comprises:

(a) a plurality of product rejection means for rejecting unnecessary products from said conveyer at different positions; and (b) driving means for driving said plurality of product rejection means, said driving means receiving said product reject signal and product inspection position arrival signal from said inspection system and then producing driving signals to drive said plurality of product rejection means in time sharing manner whereby said plurality of product rejection means reject the unnecessary products from said conveyer at different positions.

The other objects, features and advantages of the present invention will become apparent from the following description taken in conjunction with the accompanying drawings through which the like references designate the same elements and parts.

BRIEF DESCRIPTION OF THE DRAWINGS

FIG. 2 is a wiring diagram of one example of the logic circuitry of the control system that controls the rejection mechanism function; and FIGS. 3A–3O are waveform diagrams used to explain the operation of the circuitry shown in FIG. 2.

DESCRIPTION OF THE PREFERRED EMBODIMENTS

Figure 1:
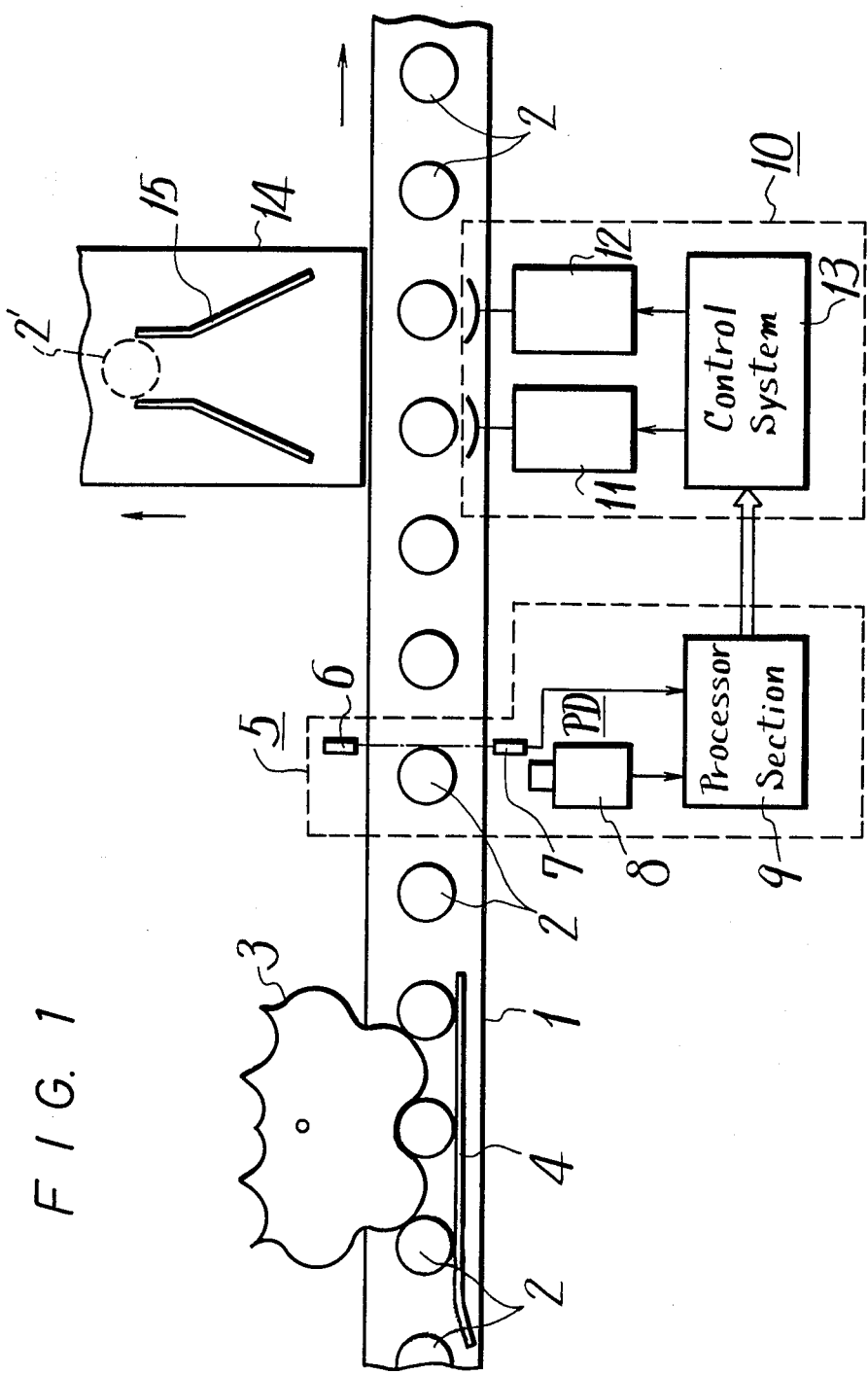
FIG. 1 is a schematic diagram showing a product inspection system that is equipped with one example of the rejection system according to the present invention.

One example of the present invention at which the bad product rejection capability, for example, was increased by using a plurality of bad product rejection mechanisms at one inspection system will be explained in reference with the attached drawings hereunder.

It is noted that explanations of the present invention will be made on an example case where two sets of bad product rejection mechanisms are used on one inspection system in order to simplify the explanation. FIG. 1 illustrates a case where the above-mentioned example of the present invention is applied to a product inspection system, whereas objects 2 to be inspected flow on belt conveyer 1. The inspected objects 2 which continuously flow on the belt conveyer 1 in the direction indicated by an arrow parallel to belt conveyer 1, are guided by both of a guide member such as a star wheel 3 and guide plate 4 to line up at regularized intervals and to also flow at the center of belt conveyer 1 along the direction of the arrow. Reference numeral 5 generally designates a well known product inspection system which, for instance, automatically inspects the shape, flaws or dirt, etc., on the inspected object 2, and when such a defect is found on the inspected object 2, it generates a bad product reject signal. This product inspection system 5 includes a position discriminator PD which includes a light emitter 6 and light receiver 7 and detects the arrival of the inspected object 2 at a predetermined inspection position. In other words, when the inspected object 2 arrives at the predetermined inspection position, the light beam from the light emitter 6 is shielded so that the light receiver 7 generates an inspection start signal. Further, the product inspection system 5 include an image sensor 8 such as a video camera or the like which picks up the inspected object 2 and outputs a video signal thereof, and a processor section 9 which receives the inspection start signal as generated at light receiver 7 and inspect-processes the video signal from the image sensor 8 such as the video camera or the like that picks up the inspected object 2. In other words, as the inspection start signal is supplied to the processor section 9 from light receiver 7, the processor section 9 processes the video signal of the inspected object 2 from the image sensor 8, to judge the good or bad of the inspected object 2, and generates a bad product reject signal when the inspected object 2 contains a defect. Further, the above position detection signal does not have to depend upon only the position discriminator PD as construed by the light emitter 6 and light receiver 7, but may be, for instance, obtained mechanically by the rotation angle of star wheel 3 that is a part of the inspection system 5, or by other means.

At FIG. 1, reference numeral 10 indicates the entire rejection system of the present invention. This rejection system 10 comprises a plurality (in this case as shown on the drawing, two each) of bad product rejection mechanisms 11 and 12 such as magnetic plungers or the like as an example, as well as a driver or control system 13 (later described) which generates signals to control their functions. This rejection system 10 sends out the bad products 2' by the bad product reject mechanisms 11 or 12 at a predetermined position to, for instance, a bad product removal belt conveyer 14, after the inspected object 2 has been judged as a bad product by the inspection system 5 as it flows further down stream on the belt conveyer 5.

On this bad product removal belt conveyer 14, a guide plate 15 is arranged so that the bad product 2' that is rejected by the bad product rejection mechanisms 11 or 12, lines up at about the center of the bad product removal conveyer 14.

FIG. 2 illustrates an example of the logic circuitry LG or the control system 13 according to the invention which generates signals to control the functions of bad product reject mechanisms 11 and 12, whereas this logic circuitry LG mainly consists of signal distributor section 13A and signal delay section 13B which produces signals to actuate the bad product reject mechanisms 11 and 12 in a time sharing manner.

The construction and function of the logic circuitry LG as shown on FIG. 2, will be explained in reference with the timing chart of FIG. 3 hereunder.

The position detection signal which indicates that the inspected object 2 has arrived at the predetermined inspection position as generated from the position discriminator PD which includes light emitter 6 and light receiver 7, is supplied to one input terminal A1 of the logic circuitry LG after passing the processor section 9, while to the other input terminal A2, the bad product reject signal is supplied which is generated from the processor section 9 of the product inspection system 5 when a bad product is discovered thereby among the inspected objects 2. Character a of FIG. 3A shows the position relation of the inspected objects 2 on the belt conveyer 1, while FIG. 3B shows the position detection signal b from the light receiver 7, and FIG. 3F shows the bad product reject signal f from the processor section 9. In this case, the signal f indicates that the inspected object 2 which is at the inspection position 0 in FIG. 3A is a bad product.

The position detection signal b that is supplied to input terminal A1 is first supplied to a T terminal of flip-flop 16 in the signal distributor section 13A of the logic circuitry LG. Since a D terminal and $\overline{F}$ terminal of this flip-flop 16 are connected together, signals d and e, which are opposite in polarity as shown on FIG. 3D and 3E, are respectively obtained at output terminal F and output terminal $\overline{F}$ of flip-flop 16 by the position detection signal b (which serves as the clock of flip-flop 16). These signals d and e act to distribute or to control whether to drive either bad product reject mechanism 11 or 12. In other words, while supplying d to one input terminal of AND gate 17, and supplying signal e to one input terminal of AND gate 18 respectively, to the other input terminals of AND gates 17 and 18, the bad product reject signal f is supplied which was supplied to the input terminal A2 of the signal distributor section 13A.

The outputs from AND gates 17 and 18 are respectively supplied to inputs IN of registers 19 and 20 of the signal delay section 13B in the logic circuitry LG. Shift registers 19 and 20 are used to delay output signals from AND gates 17 and 18 so that the bad product reject mechanisms 11 and 12 are caused to function upon time delay beginning at the time the bad product reject signal f is generated. Thus, the bad product corresponding to the bad product reject signal f as generated from the processor section 9 of the inspection system 5, is rejected at a distant location from the inspection position. A signal c which is an inverted position detection signal b by inverter 21 as shown on FIG. 3C is supplied to T terminals of shift registers 19 and 20 as the clock. At the illustrated example, since the signal d that is supplied to AND gate 17 from the flip-flop 16 is "1" when the bad product reject signal f is generated, the bad product reject signal f passes the AND gate 17 and is supplied to the input terminal IN of the shift register 19. On the other hand, at this time, the signal e being a "0", there is no output generated from AND gate 18. Therefore, at this time only shaft register 19 takes signal c as the clock, and shifts the input signal f in step by step. On FIG. 3G, FIG. 3H and FIG. 3I, characters g, h and i respectively show the output signals appearing at the 1st, 2nd and 3rd stages of shift register 19. In the case of this example, since the rejection mechanism 11, which is to reject the 3rd product which is a bad product, down line from the inspection position, the 3rd output i from shift register 19 is supplied to one of the input terminals of AND gate 22. In the same manner, the 4th output from the other shift register 20 which presently does not function, is supplied to one of the input terminals of AND gate 23. To the other input terminal of AND gate 22, signal e is supplied from the $\overline{F}$ output terminal of flip-flop 16. In other words, since signals e and i are supplied to both of the input terminals of AND gate 22, the output obtained at the output side of AND gate 22 is like signal j as shown on FIG. 3J. By feeding this signal j to a B input terminal of one-shot multivibrator 24, signal k as shown on FIG. 3K is obtained at Q output terminal thereof. This signal k is supplied to the bad product reject mechanism 11 through output terminal B1 of the logic circuitry LG as the bad product reject function signal. Since this bad product reject mechanism 11 should only reject the bad product at the 3rd sequence after the inspection position, the length of the ON period of function signal k can be taken up to a maximum of about double of the distance between two consecutive flowing inspected objects 2. Therefore, one bad product reject mechanism 11, to which this function signal k is fed through output terminal B1, can function with sufficient time to reject the bad product. In continuation, when the next bad product reject signal f is delivered (refer to the broken line in FIG. 3F), the AND gate 17 delivers no output because at this time signal d is "0", but the other AND gate 18 delivers an output since at this time, on the contrary, signal e is "1". Therefore, shift register 20 functions in the same manner to shift register 19 so that the other bad product reject mechanism 12 functions the same as the former. In this case, since the former bad product reject mechanism 11 is arranged to reject a bad product at the 3rd position after the inspection position, the later reject mechanism 12 is arranged to only reject a bad product at another position such as the 4th position after the inspection position. Therefore, the output of shift register 20 at its 4th stage is supplied to one input terminal of AND gate 23. In the same manner, the signal m as shown on FIG. 3M from AND gate 23 is fed to B input terminal of one-shot multivibrator 25, from which bad product reject function signal n is derived as shown on FIG. 3N as an example, to drive bad product reject mechanism 12 in the same manner to bad product reject mechanism 11 for a sufficient time period, whereas this signal n is fed to bad product reject mechanism 12 through output terminal B2. In this case, the ON periods of signals k and n may be timed to overlap. In other words, in this example case, when a continued consecutive output of signal f occurs, the bad product reject mechanisms 11 and 12 respectively take care of the consecutively continued rejects.

Further, the reversed signal k' of the signal k as shown on FIG. 3K' which is obtained at $\overline{Q}$ output terminal of one-shot multivibrator 24, is fed to B input terminal of one-shot multivibrator 26, and signal l as shown on FIG. 3L as obtained from $\overline{Q}$ output terminal of the latter is supplied to $\overline{R}$ terminal of shift register 19 to reset shift register 19. In the same manner, signal n' as shown on FIG. 3N' from $\overline{Q}$ output terminal of one-shot multivibrator 25, is fed to B input terminal of one-shot multivibrator 27, and signal o as shown on FIG. 3O as obtained from its $\overline{Q}$ output terminal, is supplied to $\overline{R}$ input terminal of shift register 20 to reset this shift register 20. As such, the logic circuitry LG, consequently the bad product reject system 10, enters a waiting condition for next bad product reject signals from inspection system 5.

As described above, according to the present invention, a plurality of bad product reject mechanisms (in the example case of the drawings, two sets) are placed after the product inspection position against one set inspection system, whereas these bad product reject mechanisms are driven in time sharing manner based on the bad product reject signals and position detection signal from the inspection system to reject the bad products from belt conveyer 1 when they arrive at each corresponding position, so that even when the product inspection is conducted at high speeds, where bad products may appear in quantity and consecutively, the bad products can be accurately and positively rejected. Further, in this case, each bad product reject mechanism can be driven for a sufficient time to ensure that the bad products are rejected.

Moreover, under the present invention, a plurality of bad product reject mechanism may be disposed at different positions so that each bad product reject mechanism is provided with sufficient time to recover, in comparison to conventional examples where only one set of reject mechanism is provided, the bad product rejection function becomes increasingly positive.

Furthermore, at the above described example case, instead of having bad product removal conveyer 14, bad product accumulation buckets (not shown on the drawings) may be arranged at the side of belt conveyer 1, so that the bad products on belt conveyer 1 are dropped into the accumulator buckets by bad product reject mechanisms 11 and 12, etc.

It is obvious also that bad product rejection at other positions can be easily conducted by arranging changes in the structure, etc. of shift registers 19 and 20, although at the example case of the present invention as above described, the bad products are rejected at the 3rd and 4th positions from the inspection position.

The above described example of the present invention is a case where two sets of bad product reject mechanisms are arranged, but when three or more rejection mechanisms are to be arranged in order to comply with such necessities, by changing the structure of the control system 10, whereas if the signal distributor section 13A and signal delay section 13B capacities at the logic circuitry LG are increased as necessary, it is obvious that more than three bad product reject mechanisms can be driven in time sharing manner as in the case of two sets to reject the bad products.

While the above description was the case where the rejection system of the present invention was an example case applied to reject the bad products, it is also obvious that the rejection system of the present invention may be applied to reject good products or segregation purposes.

It will be apparent that many modifications and variations could be effected by one skilled in the art without departing from the spirits or scope of the novel concepts of the present invention, so that the scope or spirit of the invention should be determined by the appended claims only.

I claim as my invention:

1. A product rejection system for use with an inspection system for rejecting products from a high speed conveyor, said product inspection system being disposed at a first location on said high speed conveyor, said product inspection system being effective for inspecting said products and for generating a product reject signal in response to a detection of a bad product, comprising:

means for sensing a first time each of said products enters said first location and for producing a product inspection position arrival signal;

first rejection means at a second location spaced a first predetermined distance downstream of said first location;

at least a second rejection means at a third location spaced a second predetermined distance downstream of said second location;

each of said rejection means including means for removing a selected one of said products from said conveyor;

a first timing means responsive to alternate ones of said product reject signals for producing a first enabling signal effective for actuating said first rejection means timed to occur at a second time following said first time, said second time occurring in coincidence with said product being positioned within an influence of said first rejection means; and a second timing means responsive to other ones of said product reject signals for producing a second enabling signal effective for actuating said second rejection means timed to occur at a third time following said first time, said third time occurring in coincidence with said product being positioned within an influence of said at least a second rejection means whereby a higher rate of product removal from said high speed conveyor is achieved by alternate actuation of at least two rejection means than is possible with a single rejection means.

2. A rejection system as claimed in claim 1, in which each of said first and second timing means includes a first flip-flop receiving said product inspection position arrival signal and producing first and second signals opposite in phase with each other and first and second AND gates, said first AND gate receiving said first signal and said product reject signal, said second AND gate receiving said second signal and said product reject signal, whereby said first and second outputs are produced by said first and second AND gates in an alternate manner.

3. A product rejection system for use with an inspection system for rejecting products from a high speed conveyor, said product inspection system being disposed at a first location on said high speed conveyor, said product inspection system being effective for inspecting said products and for generating a product reject signal in response to a detection of a bad product, comprising:

means for sensing a first time each of said products enters said first location and for producing a product inspection position arrival signal;

first rejection means at a second location spaced a first predetermined distance downstream of said first location;

at least a second rejection means at a third location spaced a second predetermined distance downstream of said second location;

each of said rejection means including means for removing a selected one of said products from said conveyor;

a first timing means responsive to alternate ones of said product reject signals for producing a first enabling signal effective for actuating said first rejection means timed to occur at a second time following said first time, said second time occurring in coincidence with said product being positioned within an influence to said first rejection means;

a second timing means responsive to other ones of said product reject signals for producing a second enabling signal effective for actuating said second rejection means timed to occur at a third time following said first time, said third time occurring in coincidence with said product being positioned within an influence of said at least a second rejection means;

a first flip flop effective for receiving said product inspection position arrival signal and for switching first and second signals into alternate opposite conditions upon receipt of each product inspection position arrival signal;

a first AND gate receiving said first signal and said product inspection position arrival signal, said first AND gate being effective for producing a first output signal;

a second AND gate receiving said second signal and said product inspection position arrival signal, said second AND gate being effective for producing a second output signal; and said first and second output signals occurring alternately in time;

said first output signal being effective for actuating said first timing means; and said second output signal being effective for actuating said second timing means.

4. A rejection system as claimed in claim 3, in which said first and second timing means respectively receive said first and second outputs from said first and second AND gates, said first and second timing means being effective for delaying said product inspection position arrival signal.

* * * * *